(12) United States Patent
Kurita et al.

(10) Patent No.: US 7,216,806 B2
(45) Date of Patent: May 15, 2007

(54) CONTAINER HANDLING APPARATUS, CONTAINER MANAGEMENT SYSTEM, AND METHOD OF CONTAINER HANDLING

(75) Inventors: Koichi Kurita, Horoshima-ken (JP); Masanori Masumoto, Hiroshima-ken (JP); Takashi Chikura, Hiroshima-ken (JP); Masato Kobayashi, Hiroshima-ken (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 110 days.

(21) Appl. No.: 11/050,881

(22) Filed: Jan. 27, 2005

(65) Prior Publication Data

US 2006/0113384 A1    Jun. 1, 2006

(30) Foreign Application Priority Data

Nov. 29, 2004 (JP) ............................. 2004-344054

(51) Int. Cl.
*G06F 19/00* (2006.01)
(52) U.S. Cl. ........................................ 235/385; 235/375
(58) Field of Classification Search ................ 235/385, 235/383, 382, 382.5, 375, 492, 449; 340/539.29, 340/506, 539.26, 425.5, 10.1; 700/215
See application file for complete search history.

(56) References Cited

U.S. PATENT DOCUMENTS

| | | | |
|---|---|---|---|
| 5,780,826 A | 7/1998 | Hareyama et al. | |
| 6,356,802 B1 * | 3/2002 | Takehara et al. | 700/215 |
| 2001/0042996 A1 * | 11/2001 | Gaspard et al. | 296/178 |
| 2004/0233041 A1 * | 11/2004 | Bohman et al. | 340/10.1 |
| 2005/0248456 A1 * | 11/2005 | Britton et al. | 340/539.29 |
| 2006/0011721 A1 * | 1/2006 | Olsen et al. | 235/385 |
| 2006/0153455 A1 * | 7/2006 | Takehara et al. | 382/181 |

FOREIGN PATENT DOCUMENTS

| | | |
|---|---|---|
| JP | 11-020951 A | 1/1999 |
| JP | 2003-312854 | 11/2003 |

* cited by examiner

*Primary Examiner*—Thien M. Le
(74) *Attorney, Agent, or Firm*—Lowe Hauptman & Berner, LLP (57) ABSTRACT

A container handling apparatus, a container management system, and a method of container handling are provided in which information of a container to be handled is accurately recognized automatically, in order to improve the efficiency of a container handling operation. An RF-ID reader/writer (wireless communication device) is provided in a container crane, on a beam of a spreader holding the container, facing a lengthwise end face of the container. An RF-ID tag (wireless tag) that stores container information is installed on a lengthwise end part of the container. The construction is such that the RF-ID tag reader/writer performs wireless communication with the RF-ID tag when the spreader is located on the transporting route of the container. The container information includes output of sensors provided on the container that detect security information of the container.

6 Claims, 6 Drawing Sheets

CONTAINER HANDLING APPARATUS, CONTAINER MANAGEMENT SYSTEM, AND METHOD OF CONTAINER HANDLING

RELATED APPLICATIONS

The present application is based on, and claims priority from, Japan Application Serial Number 2004-344054, filed Nov. 29, 2004, the disclosure of wich is hereby incorporated by reference herein in its entirety.

BACKGROUND OF THE INVENTION

1. Field of the Invention

The present invention relates to a container handling apparatus which performs container handling, a container management system, and a method of container handling.

2. Description of Related Art

A container terminal is provided with; container cranes (container handling apparatuses) which are quay cranes for handling containers for container vessels, storage areas where the containers are stacked and kept at predetermined positions, Automatic Guided Vehicles (hereafter referred to as "AGV") which transport the containers between the container cranes and the storage areas, and transfer cranes (container handling apparatuses) which load the containers in the storage areas onto visiting trailers, and which stack the containers on the AGVs at predetermined positions in the storage areas. Also, there are container terminals provided with transfer equipment (container handling apparatuses) which transport the containers between the AGV and the trailer. Moreover, there are container terminals where a trailer transports the containers between the storage areas and the container cranes.

Furthermore, for example, when containers in the storage area are loaded into a vessel, the container is loaded onto an AGV by a transfer crane, and this AGV transports the container to the position below the container crane, and the container crane performs handling of the container.

When container handling is performed using the container handling apparatuses described above, such as a container crane that loads and unloads the containers from a container vessel, a transfer crane that stacks the containers in a storage area, and transfer equipment, then it is verified where the handled container needs to be transported to, which AGV or trailer the container is to be loaded onto, and which position on the container vessel the container is to be loaded onto.

The verification operation of each container is performed by an operator who is stationed on the container handling apparatus, or an operator involved with container handling. However recently, automation of this verification operation has been considered.

For example, the technique described in Japanese Unexamined Patent Publication No. 2003-312854 (e.g. column 9, lines 12–40) is known as a technique for this automation.

To describe this more in detail, in the above patent publication, an example is described in which a communication device having a data reading device for reading container information stored in a data carrier installed on the container, is provided on a container handling apparatus that performs container handling with a spreader that holds the container.

However, since reading container information from the data carrier is performed by wireless communication with a communication device, then depending on conditions, there is a possibility that it is not possible to correctly read the container information.

For example, since the containers are stacked and adjacent to each other, then in the case where the data carrier of a container that is not the target of container information reading (hereafter referred to as "non-target container"), is positioned within the communicable range of the communication device due to the orientation or position of the container, or in the case where the communication strength between the non-target container and the data carrier is greater than the communication strength between the container that is the target of container information reading (hereafter referred to as "reading target container"), and the data carrier, there is a possibility of having the data carrier of the reading target container confused with the data carrier of a non-target container.

In such a case as this where accurate reading of the container information cannot be performed, a mistake in container verification may occur, and in this case, containers need to be re-stacked. This becomes a significant cause of decreased container handling efficiency.

BRIEF SUMMARY OF THE INVENTION

The present invention has been made in consideration of the above circumstances, with an object of providing a container handling apparatus, a container management system, and a method of container handling, in which information of a container to be handled is accurately recognized automatically, in order to improve the efficiency of a container handling operation.

In order to solve the above problem, the present invention provides following means.

The present invention provides a container handling apparatus used in handling a container provided with a wireless tag that stores container information, comprising: a spreader which holds the container, and a wireless communication device provided on the spreader, which reads container information from the wireless tag and writes container information to the wireless tag by wireless communication, wherein the wireless communication device performs wireless communication with the wireless tag in the case where the spreader is on a transporting route of the container.

While the container is being transported by the spreader, except for the container that the spreader is holding, everything else is distanced from the spreader, or is displaced relatively with respect to the spreader.

This container handling device is constructed so that the wireless communication device performs wireless communication with the wireless tag when the spreader is positioned on the transporting route of the container, that is, wireless communication is performed while the spreader is transporting the container.

Therefore, the wireless communication device can either perform wireless communication only with the wireless tag provided on the nearest container, that is, the container currently being transported (the target container for reading), or can distinguish between communication with the wireless tag provided on the container currently being transported (that is, communication having its substantially constant signal strength at maximum level), and communication with a wireless tag provided on a container not to be read (communication having fluctuating signal strength), based on the presence of a change in wireless communication status (change in signal strength and the like).

Furthermore, with this container handling apparatus, since the transporting operation of the container with the spreader is performed in parallel with the communication operation of the wireless communication device with the wireless tag, the required time for the container handling operation can be shortened.

Here, examples of the container information are: container identification information; container shape information; container type such as reefer or normal container; content type of the container; sender and departure location of the container; recipient and destination of the container; transport route of the container; weight of the container; container storage or stacking location; and frequency of container use.

Also, new container information relating to the container handling may be written into the wireless tag at each handling of the container. This written container information is transferred along with the container according to the movement of the container, and is appropriately disclosed as needed. Writing new container information means, for example, overwriting the previously written container information or additionally writing new information relating to the container handling. An example of the container information to be newly written is, container information such as history of container handling, and container storage location or changes in container storage location that had been previously stored.

Also, in the container handling apparatus the container information may include output of sensors provided on the container to detect security information of the container.

With a container handling apparatus configured in this way, since security information of the container is included in the container information, the security status of the container can be gained without inspecting or opening the container when handling the container (that is, without interrupting handling operations).

Here, the security information of the container is: opening and closing history information of the container; information of temperature history and humidity history inside the container; information of illuminance history in the container; and vibration history information. These informations can be obtained based on the output of the sensors provided on the container for example.

More specifically, the opening and closing history information of the container is obtained according to the output of an opening and closing sensor or the like, provided for example on the opening and closing doors of the container. Based on this information, the entry of a suspicious individual into the container can be known.

Temperature history information, humidity history information, and illuminance history information inside the container are obtained according to the respective outputs of a temperature sensor, a humidity sensor, and an illuminance sensor provided in the container. According to these informations, whether or not inside the container has been exposed to the external atmosphere (that is, the entry of a suspicious individual into the container, or the presence of holes in the container) can be known. Also, quality control of the contents of the container can be performed based on these informations.

The vibration history information of the container is obtained according to the outputs of for example a vibration sensor, a velocity sensor or the like provided on the container. Based on this information, it can be known whether or not tampering by a suspicious individual, such as making holes in the container, has been performed. Moreover, based on this information, the history information of impacts that the container has received can be obtained, and quality control of the contents of the container can be performed.

Also, in this container handling apparatus the wireless tag may be installed on a lengthwise end face of the container, and the wireless communication device may be provided at a position which faces the wireless tag when the spreader holds the container.

Here, for the wireless tag, multifunctionalization is recently being advanced, and the tag has been made correspondingly larger.

However, since the top and bottom faces and the lengthwise side faces of the container are adjacent to or in contact with other containers when stored, if a large wireless tag is installed on these faces, there is a possibility of interference with other containers. In practice, the clearance between the side faces of containers when stored is several centimeters or less. Therefore, when the operator directly performs a verification operation of the container separately from the container verification operation at the time of the container handling operation, communication with the wireless tag becomes difficult.

On the other hand, the lengthwise clearance of containers when stored is normally about 30 to 40 cm. Accordingly, in the case where the container handling is performed using a container handling apparatus of the above construction, then among surfaces of the container, the wireless tag can be installed on the lengthwise end face which does not interfere with other containers. As a result, a large wireless tag (that is, a multifunctional wireless tag) can be used.

Moreover, in this way by installing the wireless tag for the container in a position that does not interfere with other containers, the operator can easily approach the wireless tag and perform the container verification operation.

Furthermore, the present invention provides a container management system provided with any one of the container handling apparatuses mentioned above, and also provided with a control management section, which manages the container based on the container information.

By constructing in this way, the control management section correctly obtains the container information stored in the wireless tag from the container handling apparatus, and the status of each container is recognized and managed based on the container information at a location other than the container handling apparatus, that is, in the control management section.

Therefore, individual containers that the container handling apparatus has handled can be precisely managed in the control management section, and smooth handling operations, and storage management of containers can be performed.

The present invention provides a container handling method used in handling a container provided with a wireless tag that stores container information comprising: providing on a spreader which holds the container, a wireless communication device which reads container information from the wireless tag and writes container information to the wireless tag by wireless communication, and performing wireless communication with the wireless tag by the wireless communication device while the container is being transported by the spreader.

While the container is being transported by the spreader, except for the container that the spreader is holding, everything else is distanced from the spreader, or is displaced relatively with respect to the spreader.

In this method of container handling, the wireless communication device is constructed such that the communication with the wireless tag is performed while the container is being transported by the spreader.

Therefore, the wireless communication device can either perform wireless communication only with the wireless tag provided on the nearest container, that is, the container currently being transported, or can distinguish between communication with the wireless tag provided on the container currently being transported and communication with a wireless tag provided on another container, based on the presence of change in wireless communication status.

Furthermore, with this container handling method, since the transporting operation of the container with the spreader is performed in parallel with the communication operation of the wireless communication device with the wireless tag, the required time for the container handling operation can be shortened.

Also, in this container handling method the container information may include an output history of sensors provided on the container to detect security information of the container, and in the case where the security information of the container being transported does not meet safety standards, the container may be transported to an isolation space.

In this container handling method, since containers that do not meet the safety standard are isolated, the handling of containers that are compliant with the safety standard can be continued.

Moreover, since containers that are noncompliant with the safety standard are isolated in this way, containers that are noncompliant with the safety standard can be processed in parallel with container handling operations, and operation efficiency can be improved.

By the container handling apparatus, container management system, and method of container handling of the present invention described above, the following effects are achieved.

Specifically, with this container handling apparatus, container management system and method of container handling, confusion of the wireless tag of the container that is the target for container information reading or writing, with the wireless tags of other containers can be prevented, and reading and writing of the container information into the wireless tags can be reliably performed.

Furthermore, with this container handling apparatus, container management system and method of container handling, since the transporting operation of the container with the spreader is performed in parallel with the communication operation of the wireless communication device with the wireless tag, the required time for the container handling operation can be shortened.

DETAILED DESCRIPTION OF THE INVENTION

Next, one embodiment of the present invention is described, with reference to the drawings. In the present embodiment, a container handling apparatus that is used for handling containers 3 in a container terminal 1 shown in the perspective view of FIG. 1, a container management system, and a method of handling containers are described.

Figure 1:
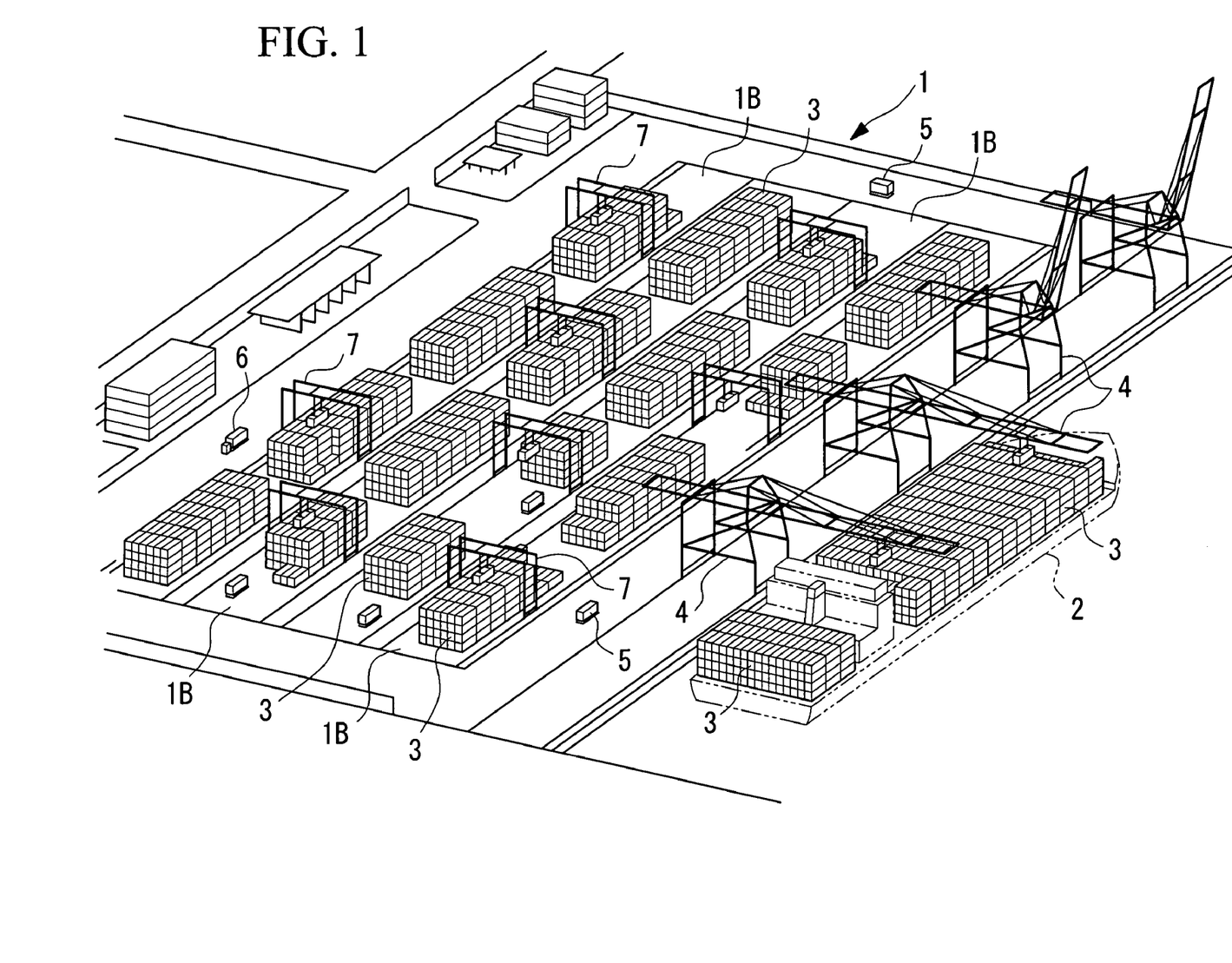
FIG. 1 is a perspective view showing a container terminal to which the present invention is applied.

The container terminal 1 is provided with: container cranes 4 (container handling apparatuses) which are quay cranes for handling containers 3 with respect to a container vessel 2; storage areas 1B where the containers 3 are stacked and kept at predetermined positions; AVGs 5 which transport the containers 3 between the container cranes 4 and the storage areas 1B; and transfer cranes 7 (container handling apparatuses) which load the containers 3 in the storage areas 1B onto visiting trailers 6 and which stack the containers 3 on the AGVs 5 at predetermined positions in the storage areas 1B.

Although FIG. 1 does not illustrate in detail, the clearance between side faces of the containers 3 which are stored is several centimeters or less, whereas the clearance in the lengthwise direction of the containers is always about 30 to 40 cm, in consideration of the necessity of verifying the container numbers.

In the present embodiment, an example is described in which the construction of the container handling device relating to the present invention is applied to the container cranes 4 and the transfer cranes 7.

First of all, the construction of the container crane 4 is described.

The container crane 4 is also known as a gantry crane. It vertically suspends a spreader 45 over the container vessel 2 which is moored to a quay, and unloads the containers 3 on the container vessel 2, and loads the containers 3 onto the container vessel 2.

Figure 2:
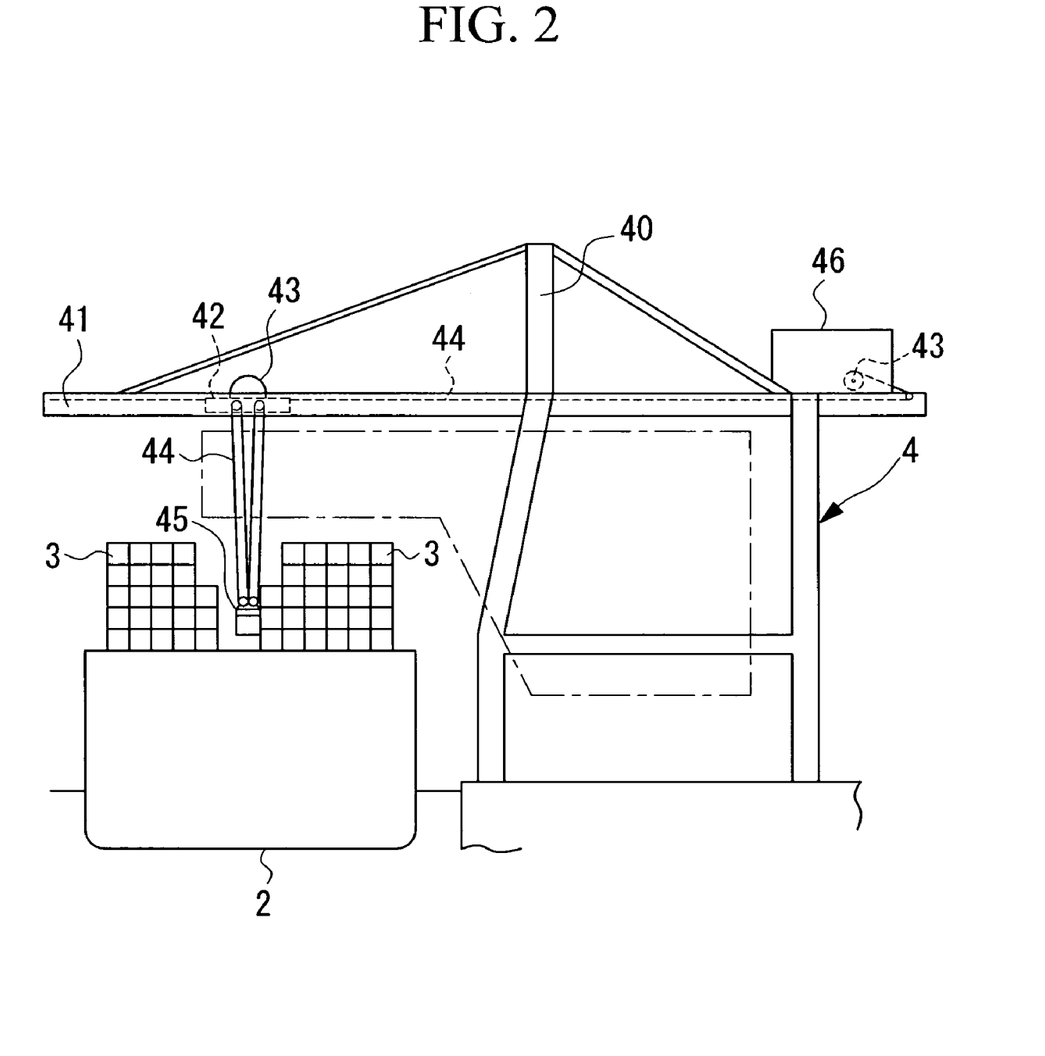
FIG. 2 is a side view for explaining the overall construction of a container crane (container handling apparatus) and the container handling operation, according to one embodiment of the present invention.

As shown in the side view of FIG. 2, a frame 40 of the container crane 4 has a horizontally supported upper beam 41, and a trolley 42 travels on a rail (not shown in the diagram) installed on this upper beam 41. Moreover, the upper beam 41 can rise and fall in accordance with the container handling operation.

A winch 43 is installed on the container crane 4, and wires 44 reeled out from the winch 43 suspend and hold the spreader 45. The winch 43 may be provided in a machine room 46 described later, and may also be provided on the trolley 42.

The spreader 45 is moved up and down as the winch 43 winds up and down the wires 44. The traveling operation of the trolley 42 is performed by a drive unit (not shown in the diagram) in the machine room 46 provided at the right of the upper beam 41 in FIG. 2. With this container crane 4, the spreader 45 can be moved beneath the upper beam 41 and between the container vessel 2 and an apron, by the movement of the trolley 42 and by winding the winch 43 up and down.

An operator's room where an operator is stationed, is provided on the trolley 42, and an operation control device 51 (see the block diagram of FIG. 6) which controls the traveling of the trolley 42, the winding up and down of the spreader 45 by the winch 43, and the traversal operation of the container crane main body 4 on the apron, is provided in the operator's room. Also, an input device 52 (see FIG. 6) for the operator to input various kinds of information, and a display device 53 (see FIG. 6) which displays various kinds of information including the information input from the input device 52, are provided in the operator's room.

An operation control section 54 (see FIG. 6) which controls the operations of the driving sections of each device, such as the winch 43 and the trolley 42 provided for the container crane 4, based on operation instructions input from the operation control device 51, is provided for the container crane 4.

Moreover, a data processing section 55 (see FIG. 6) which transmits the information obtained as a result of processing various kinds of information, including the information input from the input device 52 to the operation control section 54, and outputs various kinds of information to the display device 53, is provided for the container crane 4.

Figure 3:
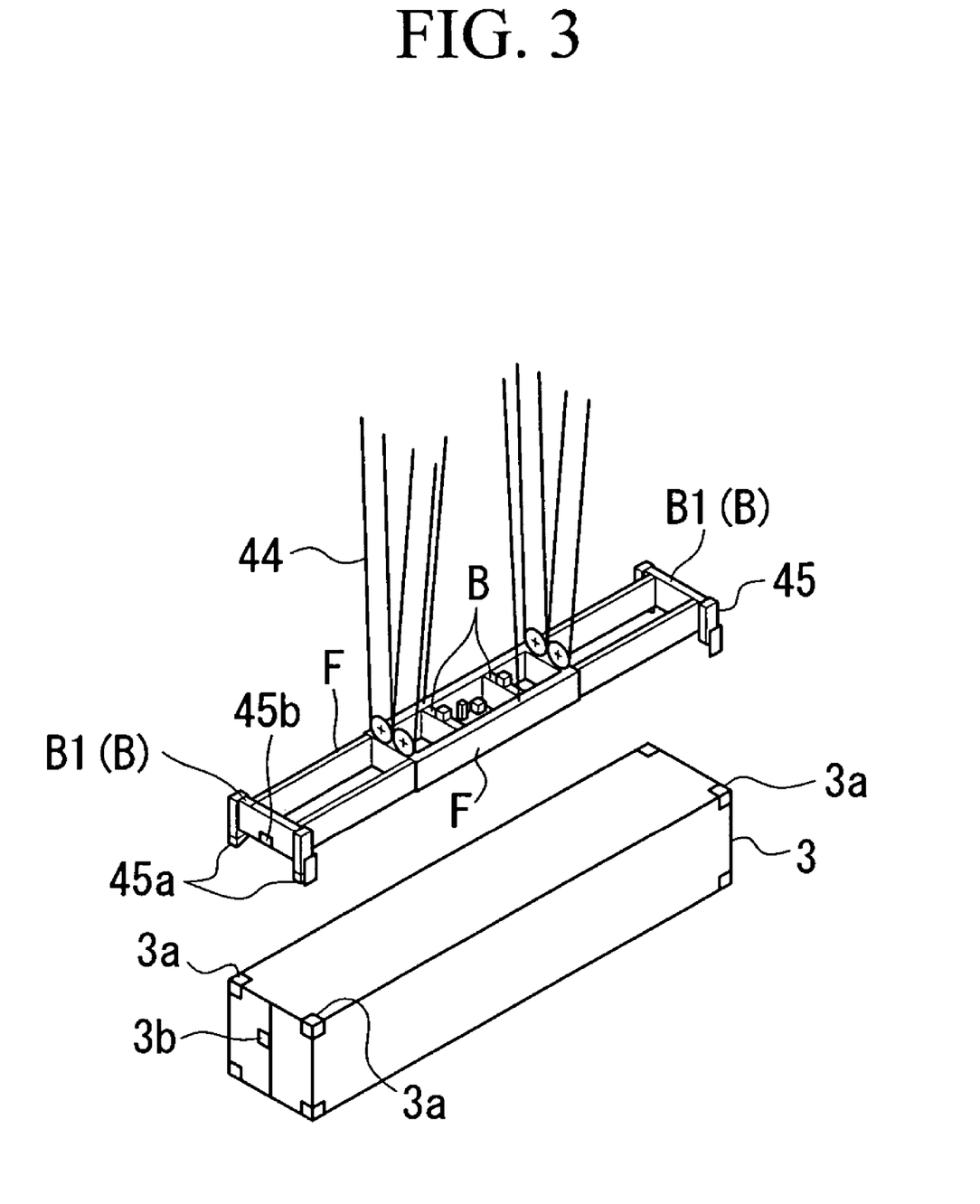
FIG. 3 is an enlarged view showing an enlargement of a spreader provided for the container crane shown in FIG. 1.

Hereunder, the spreader 45 that holds the container 3 is described in detail with reference to FIG. 3. The size of the spreader 45 is made to be substantially the same as that of the container 3 when seen in plan view. Moreover, its dimension in the lengthwise direction can be changed according to the shape of the container 3.

Twist-lock pins 45*a* are provided at the lengthwise end parts of the spreader 45 at positions respectively opposing corner parts of the container 3. Here, hole parts 3*a* are formed at the corner parts of the container 3, and the spreader 45 holds the container 3 by engaging the twist-lock pins 45*a* with the hole parts 3*a*.

This spreader 45 has two frames F extending in the lengthwise direction, and has a plurality of crossbeams B that connect these frames F at parts along the lengthwise direction. Also crossbeams B1 are respectively provided at the opposite end parts of the frames F, orthogonal to the lengthwise direction of the frames F.

At least the bottom end part of these crossbeams B1 opposes the lengthwise end face of the container 3 held by the spreader 45. On these crossbeams B1, an RF-ID tag reader/writer 45*b* (wireless communication device) which performs wireless communication with an RF-ID tag 3*b* (wireless tag) which is described later, is provided on the lower side of the lengthwise approximate center part of the crossbeam B1 on the face facing the other crossbeam B1 side.

More specifically, the RF-ID tag reader/writer 45*b* is installed in the position opposite to the RF-ID tag 3*b* in the lengthwise direction of the spreader 45 when the spreader 45 holds the container 3.

Here, in the case where the RF-ID tag reader/writer 45*b* is constructed having directivity, the directivity faces the other crossbeam B1 side (that is, the side facing the lengthwise end face of the container 3 held by the spreader 45).

By disposing the RF-ID tag reader/writer 45*b* in this way, then among the surfaces of the container 3, the RF-ID tag 3*b* can be installed on the lengthwise end face which does not interfere with the other containers 3. As a result, an RF-ID tag 3*b* of large size (that is, a multifunctional wireless tag) can be used.

Moreover, since in this way the RF-ID tag 3*b* can be installed on the container 3 in the part that does not interfere with other containers 3, the operator can easily approach the RF-ID tag 3*b* and can easily perform a container verification operation.

Furthermore, since the RF-ID tag reader/writer 45*b* is provided on both lengthwise ends of the spreader 45, it can be assured that the RF-ID tag reader/writer 45*b* opposes to the RF-ID tag 3*b* regardless of the direction of the container 3. As a result, communication with the RF-ID tag 3*b* can be performed favorably.

The purpose of installing the RF-ID tag reader/writer 45*b* in the above mentioned positions is to ensure that container information is received from the RF-ID tag 3*b* installed on the container 3. However, since these do not have to come close to each other depending on the receiving and transmitting ability of the RF-ID tag reader/writer 45*b*, the installation position of the RF-ID tag reader/writer 45*b* is not limited to this.

The RF-ID tag reader/writer 45*b* is provided with a data reading device 56 (see FIG. 6) that reads the container information, which is described later, from the RF-ID tag 3*b*, and a data writing device 57 (see FIG. 6) that writes new container information to the RF-ID tag 3*b*.

Figure 6:
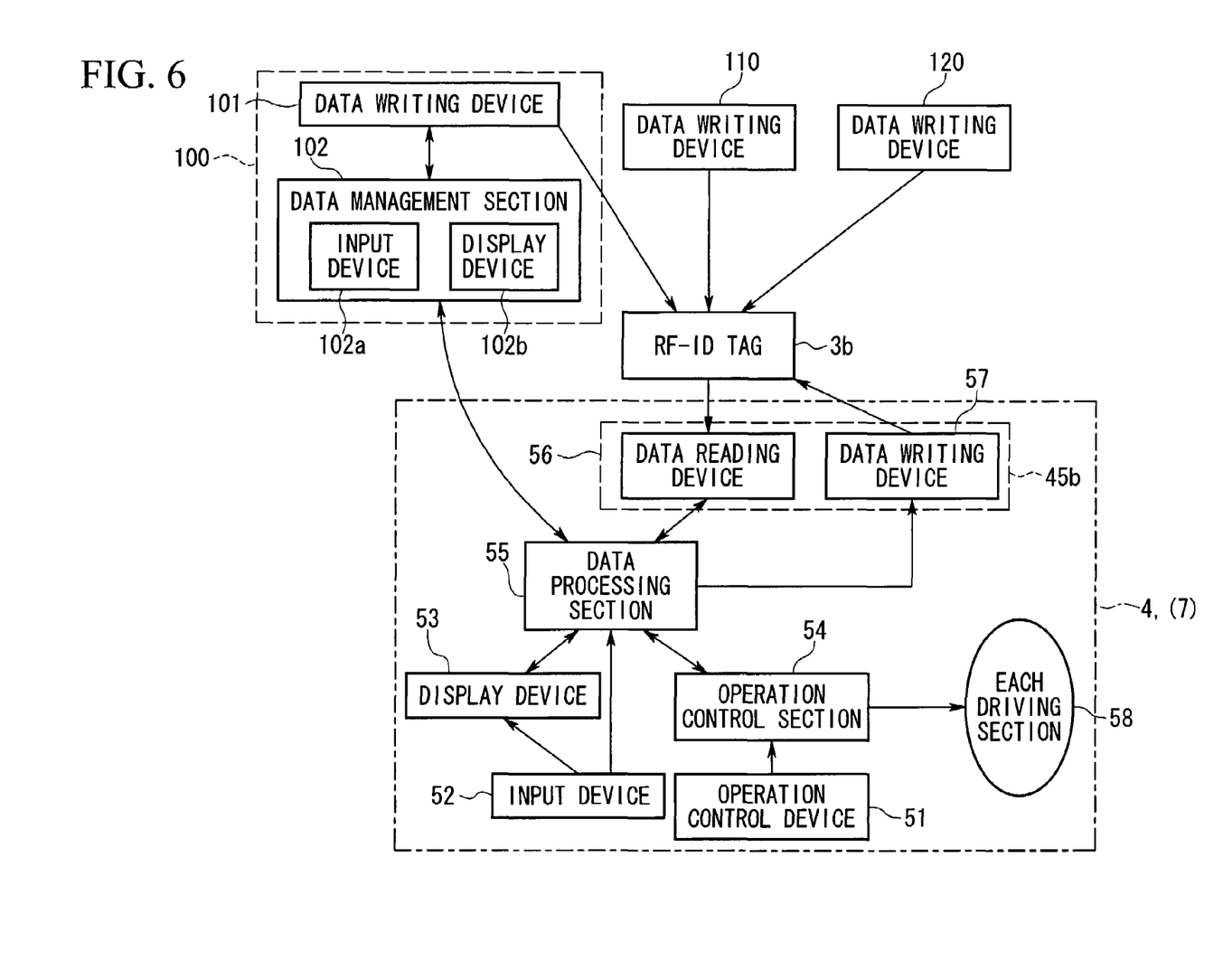
FIG. 6 is a block diagram showing container information, and the flow based thereon, of an operation control signal of a container handling apparatus, pertaining to a container management system according to one embodiment of the present invention.

These data reading device 56 and data writing device 57 are connected to the data processing section 55 via a wired communication line or wireless communication line, and the data processing section 55 controls the operations thereof.

Moreover, the container information that the data reading device 56 has read is input to the data processing section 55, and information that needs to be written is transmitted from the data processing section 55 to the data writing device 57.

The RF-ID tag 3*b* is provided on the end face upon which opening and closing doors are provided, among the lengthwise end faces of the container 3. More specifically, the RF-ID tag 3*b* is installed on the upper side of the widthwise approximate center, among the end faces upon which opening and closing doors are provided.

Furthermore, for example, magnetic recording type memory medium, nonvolatile memory or the like is used for a memory holding device of the RF-ID tag 3*b*.

Moreover, the container information stored in the RF-ID tag 3*b* is information such as: container number which identifies each container 3; container type such as reefer or normal container; container shape (overall length, height and so forth); type of contents of the container; sender and departure location of the container; recipient and destination of the container; transporting route of the container; weight of the container; position of loading on the container vessel; scheduled storage location of the container; and frequency of container use.

Among these, the container number, the container type, and the container shape are fixed informations, and the data writing device 57 is not allowed to rewrite these informations. Besides these, the data writing device 57 is allowed to modify, that is, update, informations such as: content type of the container; sender and departure location of the container; recipient and destination of the container; transporting route of the container; weight of the container; position of loading on the container vessel; and scheduled storage location of the container.

Moreover in the present embodiment, various kinds of sensors (not shown in the diagram) that detect security information of the container 3 are provided on the container 3, and the output of each sensor is stored in the RF-ID tag 3*b*. The data writing device 57 is not allowed to rewrite the output of each sensor.

For example, sensors such as: an open/close sensor which detects an open/close status of the opening and closing doors of the container 3; a thermal sensor which measures the temperature inside the container 3; a humidity sensor which measures the humidity inside the container 3; an illuminance sensor which measures the illuminance inside the container 3; and a vibration sensor which measures the vibration of the container 3 (or angular velocity sensor), are used.

These sensors are connected to the RD-ID tag 3b via a wired communication line or wireless communication line, and this allows the output from each sensor to be input to the RF-ID tag 3b.

Here, opening and closing history information of the container 3 is obtained according to the output of an opening and closing sensor (not shown in the diagram) or the like, provided for example on the opening and closing doors of the container 3. Based on this information, the entry of a suspicious individual into the container 3 can be known.

Temperature history information, humidity history information, and illuminance history information inside the container 3 are obtained according to the respective outputs of the temperature sensor, the humidity sensor, and the illuminance sensor (not shown in the diagram) provided in the container 3. According to these informations, whether or not inside the container 3 has been exposed to external atmosphere (that is, the entry of a suspicious individual into the container 3, or the presence of holes in the container 3) can be known. Also, quality control of the contents of the container 3 can be performed based on these informations.

The vibration history information of the container 3 is obtained according to the outputs of for example a vibration sensor, a velocity sensor or the like (not shown in the diagram) provided on the container 3. Based on this information, it can be known whether or not tampering by a suspicious individual, such as making holes in the container 3, has been performed. Moreover, based on this information, the history information of impacts that the container 3 has received can be obtained and quality control of the contents of the container 3 can be performed.

Figure 4:
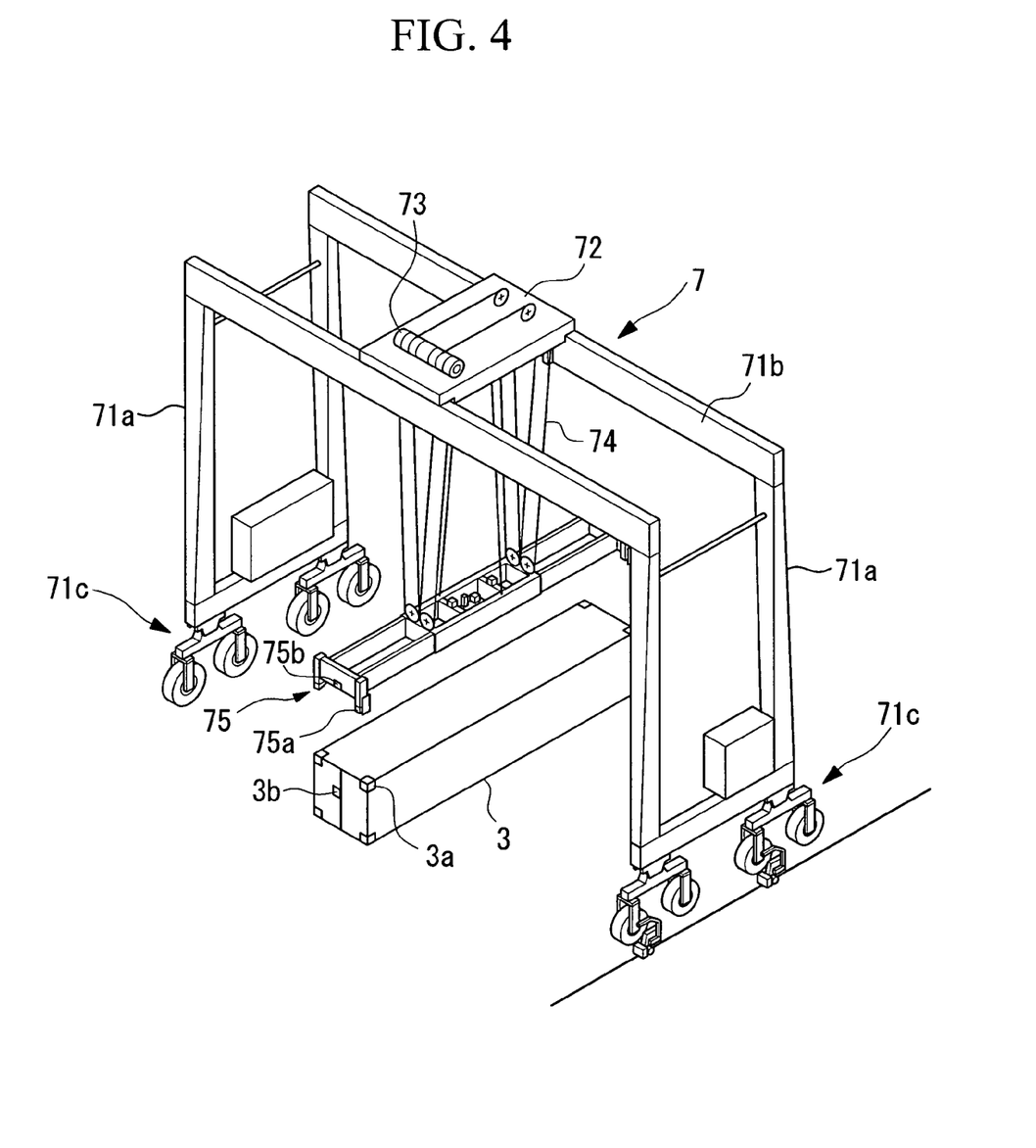
FIG. 4 is a perspective view showing the construction of a transfer crane (container handling apparatus) according to one embodiment of the present invention.

Next, the construction of the transfer crane 7 (container handling apparatus) according to the present embodiment is described with reference to the perspective view of FIG. 4 and the front view of FIG. 5. The transfer crane 7 has a gantry structure in which a pair of leg parts 71a are connected by upper beams 71b, and a space into which the container 3 can enter, is reserved below the upper beams 71b. Moreover a traveling device 71c is provided at the bottom end of each leg part 7a so that the transfer crane 7 can travel by itself to a required position.

As with the container crane 4 previously described, the spreader 75 that holds the container 3 is provided on the beams 71b.

More specifically, a trolley 72 is provided on the upper beams 71b so that it can traverse, and the spreader 75 is suspended from this trolley 72. Also, a winch 73 is provided on the trolley 72, and this winch 73 winds the spreader 75 up and down. The spreader 75 is constructed in substantially the same way as that of the spreader 45 of the container crane 4 described previously. An RD-ID tag reader/writer 75b constructed in substantially the same way as that of the above mentioned RF-ID tag reader/writer 45b is installed on the spreader 75 in a position the same as that of the RF-ID tag reader/writer 45b.

Next, the flow of the container information in handling operations, and the operation of container handling apparatuses, in a container management system that uses container handling apparatuses such as the container crane 4 and the transfer crane 7 during handling operations, are described with reference to FIG. 6. In the content described hereunder, the description is mainly for the container crane 4 shown in FIG. 2.

FIG. 6 is a block diagram showing the container information written into the RF-ID tag 3b, and the flow of the operation control of the container handling apparatuses based thereon.

The section denoted with reference symbol 100 in FIG. 6 (the section enclosed by short dashes lines at top left) is a control management section that collectively manages the container terminal. Moreover, the section enclosed by alternate long and short dash lines at the bottom of FIG. 6 is components of the container handling apparatuses 4, (7) such as the container crane 4 and the transfer crane 7 described previously.

The container information written to the RF-ID tag 3b can be appropriately written at transport destinations of the containers 3. Writing the container information into the RF-ID tag 3b is performed, for example, by an RF-ID tag writer or the like provided with data writing devices 101, 110 and 120 as shown in FIG. 6. Here, in the example shown in FIG. 6, the data writing device 101 is under the management of the control management section 100 that manages the container terminal.

The control management section 100 has a data management section 102 that manages the history management of each container 3, the operating status of the container handling apparatuses such as the container crane 4 and the transfer crane 7, and the operating status of AGVs 5 (see FIG. 1.) and trailers. Moreover, by providing the data writing device 101 at the entrance and exit of the container terminal 1, the data writing device 101 can write container information into the RF-ID tag 3b of the container 3 carried into the container terminal.

The container information that the data writing device 101 of the control management section 100 writes into the RF-ID tag 3b is written from the data management section 102 via the data writing device 101 into the RF-ID tag 3b as information of previously scheduled container handling at the container terminal 1, including for example the position for the container 3 to be stored in the container terminal 1, or the position on the container vessel 2 in which the container 3 is to be loaded. Moreover, the data management section 102 is provided with an input device 102a that inputs the above mentioned container handling schedule information, and a display device 102b that displays the input information.

In this container management system, when the container 3 is loaded on a container vessel by the container crane 4, the container information stored in the RF-ID tag 3b is read by the RF-ID tag reader/writer 45b installed on the spreader 45 provided for the container crane 4. The read container information is transmitted to the data processing section 55 provided on the container crane 4.

Having obtained the container information that each container 3 has, the data processing section 55 transmits an instruction to the operation control section 54 to automatically move the container 3 having the container information to the target position, and stores the position to which the container 3 has been moved in the handling operation.

Here, once the spreader 45 of the container crane 4 holds the container 3, the operation control section 54 transmits an operating instruction to each driving section 58 to move the spreader 45 along the transporting route of the container 3. More specifically, after the spreader 45 has been vertically lifted to a predetermined height, and moved to a predetermined position on the container vessel 2 by moving it horizontally, it is then lowered to a predetermined height.

With the spreader 45 positioned on the transporting route in this way, the data processing section 55 transmits an operating instruction to the data reading device 56 of the RF-ID tag reader/writer 45b to read the container information.

The present embodiment is constructed such that the data processing section 55 detects the current position of the spreader 45 based on the operating instruction given to each driving section 58 from the operation control section 54, and the data reading device 56 reads the container information when the spreader 45 reaches the area distanced from container 3 on the trailer 6 on the quay, from the container vessel 2, and from the container 3 on the container vessel 2, within the range that the spreader 45 is allowed to move.

Figure 5:
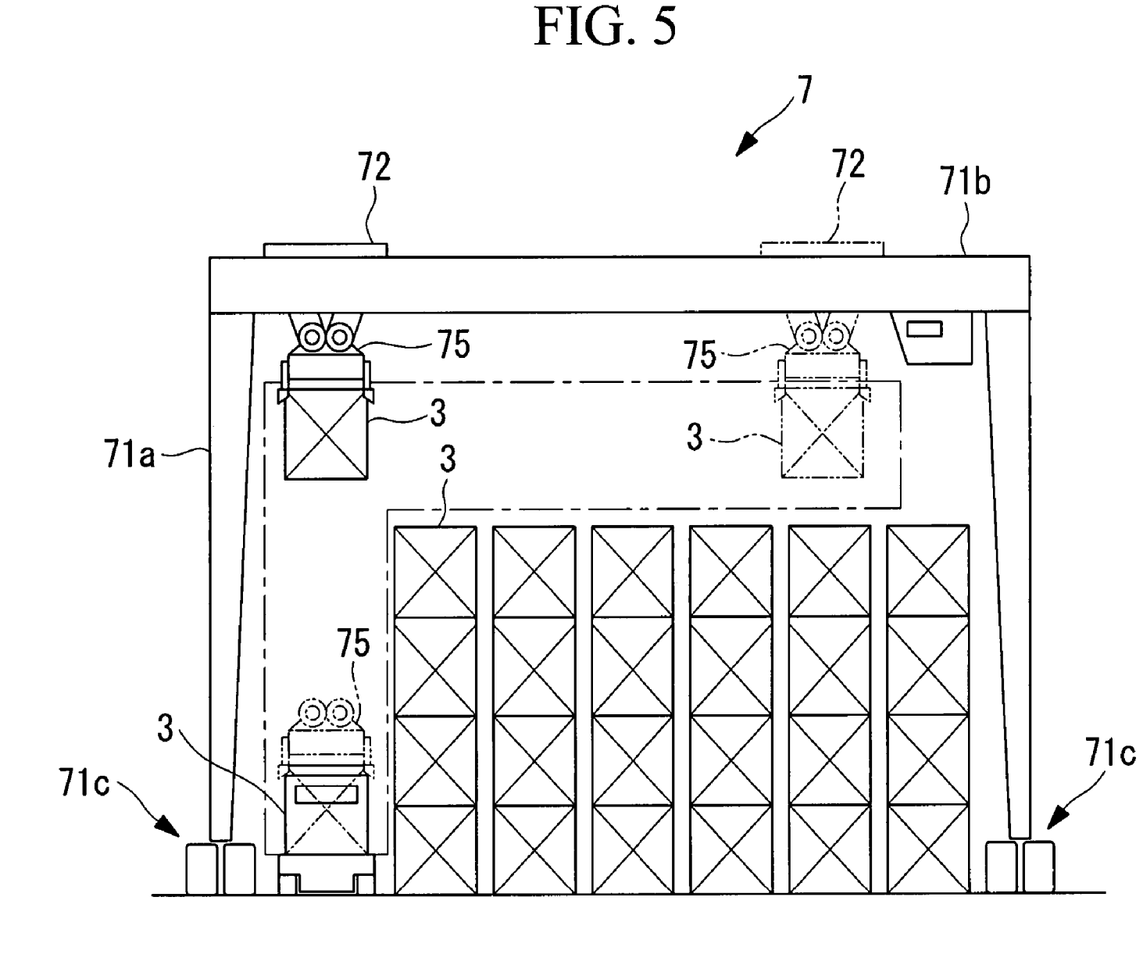
FIG. 5 is a front view of the transfer crane shown in FIG. 4.

The transfer crane 7 is constructed such that as shown in FIG. 5, the data processing section 55 makes the data reading device 56 read the container information, when the spreader 75 is positioned on the container 3 transporting route, that is, in the space over the chassis lane along which the trailer 6 passes and above the trailer 6 and in the space reserved above the container 3 storage area adjacent to the chassis lane, on the chassis lane that the trailer 6 passes (that is, with the spreader 75 positioned in the area surrounded by the alternate long and short dash lines in FIG. 5).

While the container 3 is being transported by the spreader 45, except for the container 3 that the spreader 45 is holding, everything else is distanced from the spreader 45, or is displaced relatively with respect to the spreader 45.

Therefore, the data reading device 56 can either perform wireless communication only with the RD-ID tag 3b provided on the nearest container 3, that is, the container 3 currently being transported (the target container for reading), or can distinguish between communication with the RF-ID tag 3b provided on the container 3 currently being transported (that is, communication having its substantially constant signal strength at maximum level), and communication with an RF-ID tag 3b provided on a container not to be read (communication having a fluctuating signal strength), based on the presence of a change in the wireless communication status (change in signal strength and the like).

Furthermore, since the transporting operation of the container 3 with the spreader 45 is performed in parallel with the communication operation of the RF-ID tag reader/writer 45b with the RF-ID tag 3b, the required time for the container handling operation can be shortened.

Here, since the time that the data reading device 56 requires for reading the container information is sufficiently shorter than the time required for transporting the container 3 to the target position, in many cases, reading of the container information is completed and the destination that the container 3 is to be transported to can be identified in the vertical lifting process immediately after the container 3 is held. Then after the transporting destination of the container 3 has been specified, the operation control section 54 transmits an operating instruction to each driving section 58 so that the container 3 is transported via the shortest route.

Hereunder, the control flow after the data processing section 55 acquires the container information is described in sequence.

The information of the loading position onto the container vessel 2, which is one piece of container information obtained by the data reading device 56 of the RF-ID tag reader/writer 45b, is transmitted to the operation control section 54 that controls the operation of each driving section 58 of the container crane 4 after being processed in the data processing section 55. As a result, the operation control section 54 of the container crane 4 prompts each driving section to operate so that the container 3 reaches the loading position for the container vessel 2, and the container crane 4 automatically performs the container handling operation.

To describe more specifically, if the loading position for the container vessel 2 is stored in the RF-ID tag 3b as a coordinate system, the data processing section 55 processes it into data such as the stop position of the trolley 42 and winding height of the winch 43. Then this data is transmitted to the operation control section 54 so that the operation control section 54 controls the operation of equipment such as the winch and the driving motors that make the trolley 42 move. As a result, the spreader 45 that holds the container 3 automatically reaches the target position.

Moreover, when the container information of the container 3 enters the data processing section 55 in response to commencement of handling, the data processing section 55 starts downloading and storing the operation status of the trolley 42, the winch 43 and so forth as operation history data. Then, once the container 3 handling is complete and the twist-lock pins 45a of the spreader 45 are released, so that the container 3 and the spreader 45 are separated, the container information can no longer be obtained from the RF-ID tag 3b. Therefore at this point the data processing section 55 terminates downloading the operation status from the operation control section 54, that is, it terminates storing the operation history data.

Thus, having collated the above mentioned operation history data with the container information such as the container number of the container 3, the data processing section 55 has now stored information of which traveling route the container 3 carried by the spreader 45 has passed and where it has been placed. Therefore, even if the containers 3 are stacked in multiple levels or a number of the containers 3 are stored in the storage area, the location of the container 3 having specific container information can be historically managed.

Moreover, the data processing section 55 has a function to forward the obtained container information and the historical management information of the container 3 described above to the control management section 100. That is to say, the historical management of the container 3 is managed in a similar way by the control management section 100 that manages the operation status of the container handling apparatuses and the operation status of the AGV 5 or the trailer. In this case, for example, it becomes possible to move the AGV 5 or the trailer 6 to a predetermined storage position of the container 3, or to direct the operations of container handling apparatuses, such as the transfer crane 7, relating to the container handling operation depending on the status of the container handling operation.

Furthermore, the data processing section 55 has a function to accept the information that the operator has input through the input device 52, the information from the operation control section 54, and the information from the control management section 100, and to forward these informations to the data writing device 57 for writing the container information into the RF-ID tag 3b.

To give examples of the container information to be written, the information of the position where the unloaded container 3 is stored in the container terminal, the information of confirmation that the container 3 has been loaded into a scheduled position on a vessel, and the history information of what type of container handling operation has been performed, are written for each container 3. In this way, for example, at the instant when the spreader 45 holds the container 3 to be unloaded, where the container 3 is to be stored is written. Then, the AGV 5 or the trailer that is scheduled to transport the container 3 is called through the control management section 100, and the container information of the container 3 is delivered to the transfer crane 7 that stacks the containers at the preservation area.

Also, in the previously described handling operation of the container 3, it was explained that the position where the specific container 3 has been stored in the container terminal is stored by the data processing section 55 as position information of the location of the container 3, or as operation history data of the route that the container 3 has traveled.

These informations are output from the data processing section 55 to the operation control section 54 so that the spreader 45 can be automatically moved to a predetermined position where the container 3 is located, without the operator carrying out operation control from the operation control device 51. That is to say, the operation control section 54 outputs an operation instruction to each driving section 58 based on the location information of the container 3 or operation history data of the route obtained, in order to move the spreader 45 to the target container 3.

The above operation control is preferably applied to the transfer crane 7 that stacks the container 3 in the storage area and then suspends the same container 3 and loads it onto the AGV 5 or the trailer 6.

Also, as described above, the container information stored in the RF-ID tag 3b includes the output of the sensors that are provided on the container 3 and that detect the security information of the container 3.

More specifically, opening and closing history information of the container 3, history information of temperature in the container 3, history information of humidity in the container 3, history information of illuminance in the container 3, and vibration history information are stored in the RF-ID tag 3b as security information of the container 3.

Thus, since security information of the container 3 is included in the container information, the security status of the container 3 can be gained using the container crane 4 without inspecting or opening the container 3 when handling the container 3 (that is, without interrupting handling operations).

Moreover, in the container management system, the data processing section 55 judges whether or not the security information obtained from the container 3 being transported is compliant with safety standards. In the case where the security information is not compliant with safety standards, an instruction is transmitted to the operation control section 54 to change the destination of the container 3 to a predetermined isolation space (not shown in the diagram). Furthermore, the data processing section 55 transmits the instruction to the operation control section 54 to perform handling of a new container 3 as soon as the isolation operation of this container 3 is complete.

Since this container management system isolates containers 3 that are judged to be noncompliant with safety standards during handling containers 3 in this way, handling the containers 3 which are compliant with safety standards can be continued, and the containers 3 can be handled smoothly.

Moreover, since containers that are noncompliant with safety standards are isolated in this way, containers that are noncompliant with safety standards can be processed in parallel with container handling operations, and operation efficiency can be improved.

The judgment of this security information involves judging the presence or not of an abnormality of the container 3, or entry by a suspicious person, based on the output of the above mentioned sensors, and in the case where the presence of an abnormality of the container 3 or entry by a suspicious individual is identified, the container is judged to be noncompliant with safety standards.

This security information is judged not only according to the output of the sensors, but can also be judged according to the reliability of the consignor or the safety of the transporting route for example.

According to the above described container crane 4 and container management system of the present embodiment, the information of the container 3 to be handled can be automatically recognized with accuracy, and container handling efficiency can be improved.

The effects described above can be achieved with all types of container handling apparatuses such as the transfer crane 7 and transfer equipment, and container handling apparatuses equipped with the spreaders 45 and 75.

Furthermore, the container handling apparatuses and the container management system described in the present embodiment are not to be interpreted as limited to this, and various modifications may be made within the scope of the gist of the present invention.

We claim:

1. A container handling apparatus for use in handling a container provided with a wireless tag that is capable of storing and renewing container information, said apparatus comprising:
   a spreader which is adapted to hold said container, and
   a wireless communication device provided on said spreader, which wireless communication device is adapted to, in use, read container information from said wireless tag and write container information to said wireless tag by wireless communication,
   wherein said wireless communication device performs wireless communication with said wireless tag in the case where said spreader is on a transporting route of said container.

2. A container handling apparatus according to claim 1, wherein said container is provided with sensors to detect and output security information of said container, and said container information includes said security information.

3. A container handling apparatus according to claim 1, wherein said wireless tag is adapted to be installed on a lengthwise end face of said container, and
   said wireless communication device is adapted to be provided at a position which faces said wireless tag when said spreader holds said container.

4. A container management system, comprising a container handling apparatus according to claim 1, and a control management section which is adapted to manage said container based on said container information.

5. A container handling method for handling a container provided with a wireless tag that is capable of storing and renewing container information, said method comprising the steps of:
   providing a spreader capable of holding the container;
   providing on the spreader a wireless communication device capable of reading container information from said wireless tag and writing container information to said wireless tag by wireless communication, and
   said wireless communication device performing wireless communication with said wireless tag and reading and/or writing container information from/to said wireless tag while said container is being transported by said spreader.

6. A container handling method according to claim 5, wherein said container is provided with sensors to detect and output security information of said container, and said container information includes said security information of said container, and
   in the case where said security information of said container being transported by said spreader does not meet safety standards, said container is transported to an isolated space.

* * * * *